Feb. 24, 1925.

P. B. NEWKIRK 1,527,696

TRANSMISSION MECHANISM FOR MOTOR VEHICLES

Filed Nov. 24, 1922     4 Sheets-Sheet 1

Inventor

PERRY B. NEWKIRK.

By Eugene C. Brown
Attorney

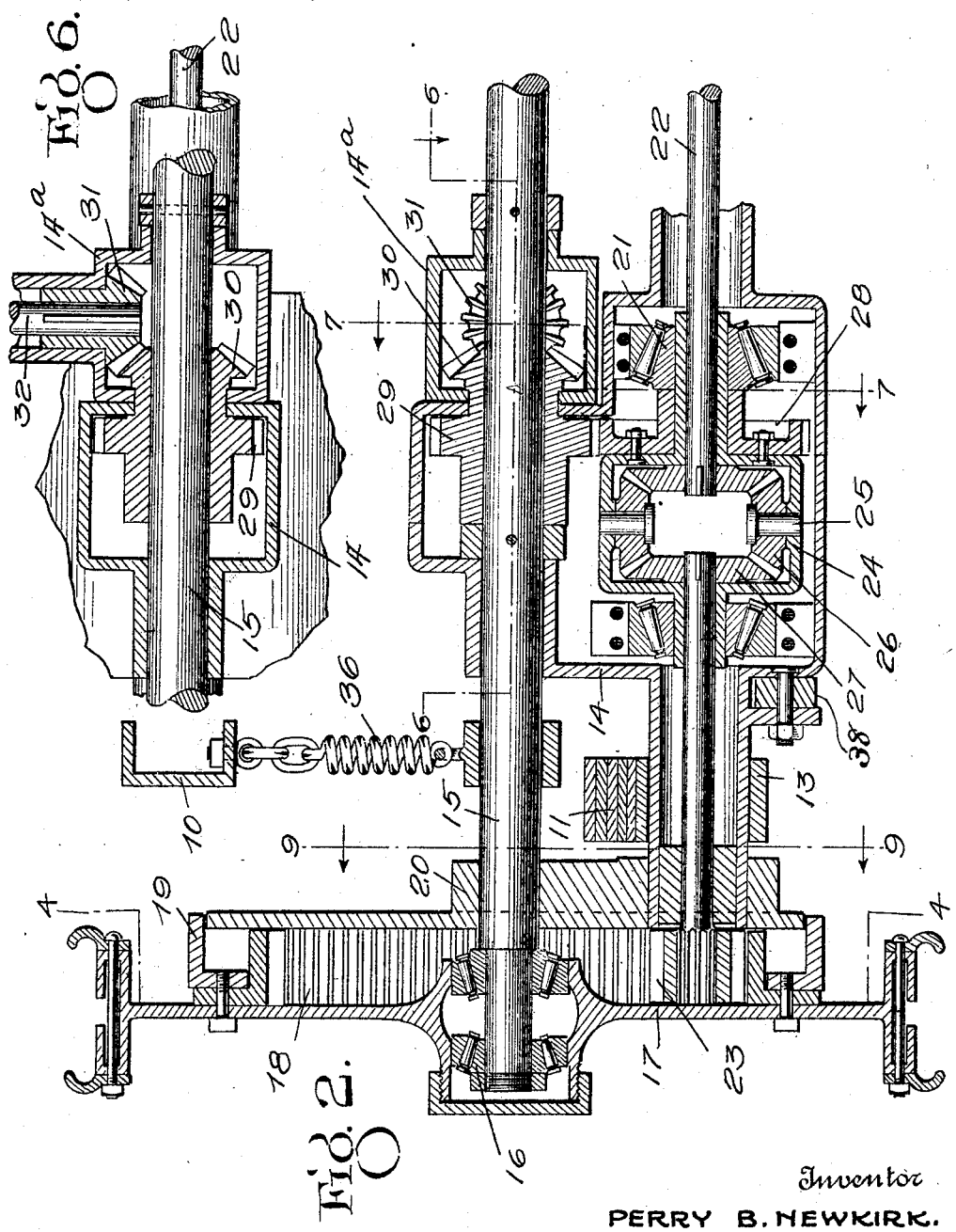

Feb. 24, 1925.
P. B. NEWKIRK
TRANSMISSION MECHANISM FOR MOTOR VEHICLES
Filed Nov. 24, 1922
1,527,696
4 Sheets-Sheet 3
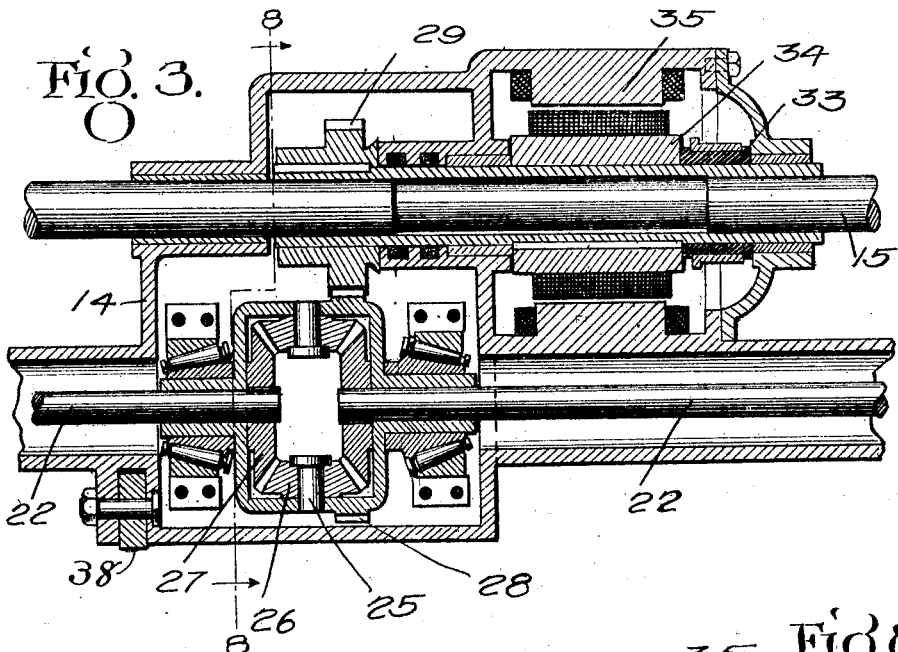
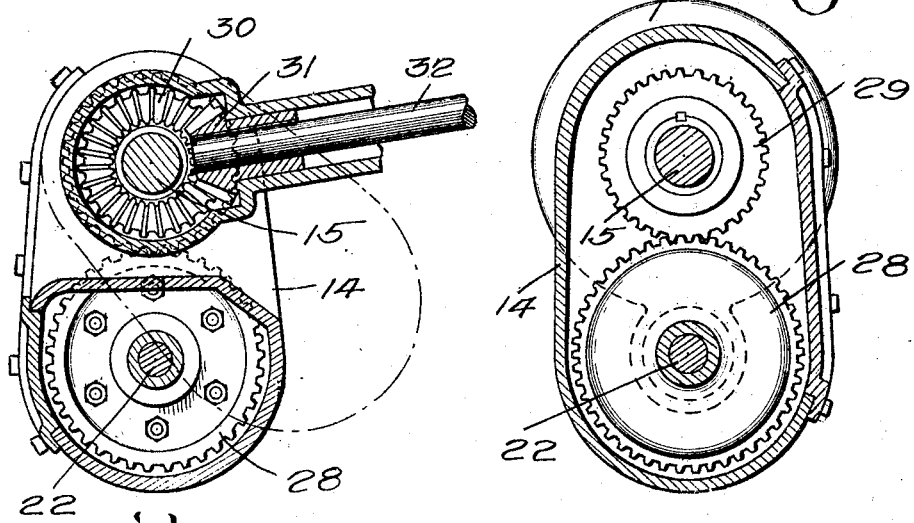
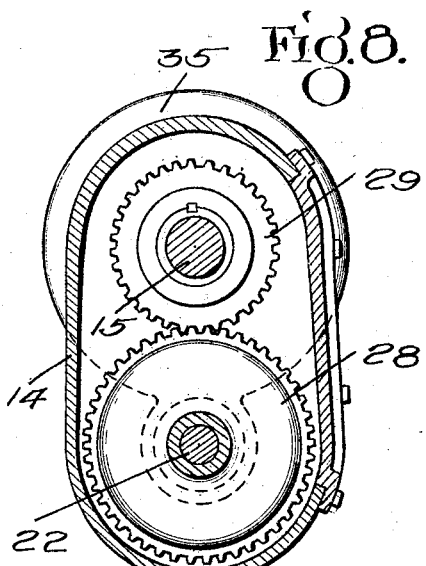
Inventor
PERRY B. NEWKIRK.
Eugene C. Brown
Attorney Feb. 24, 1925.
P. B. NEWKIRK
1,527,696
TRANSMISSION MECHANISM FOR MOTOR VEHICLES
Filed Nov. 24, 1922     4 Sheets-Sheet 4
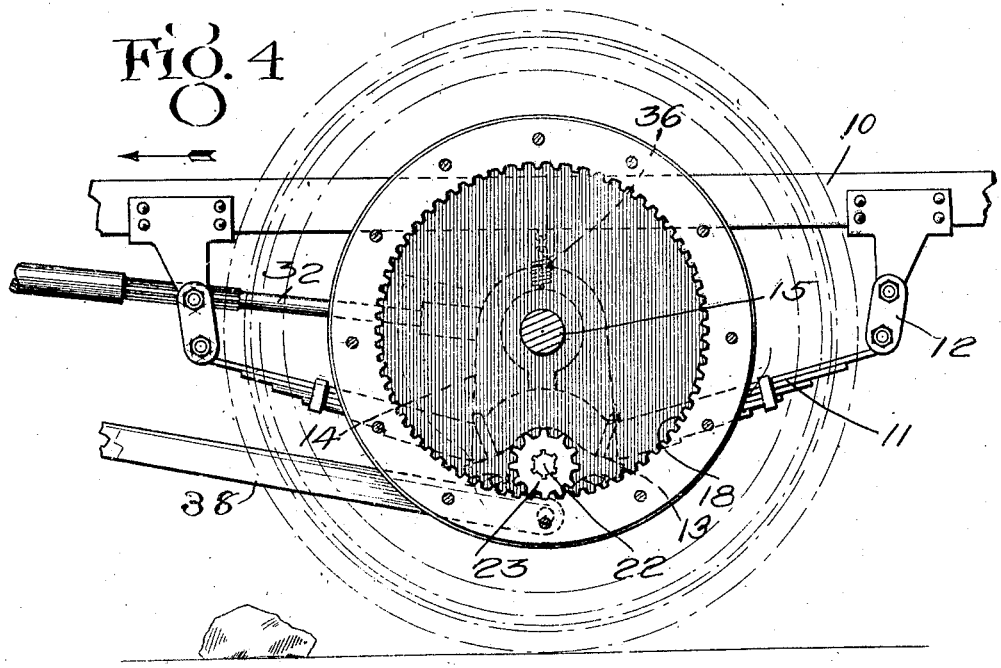
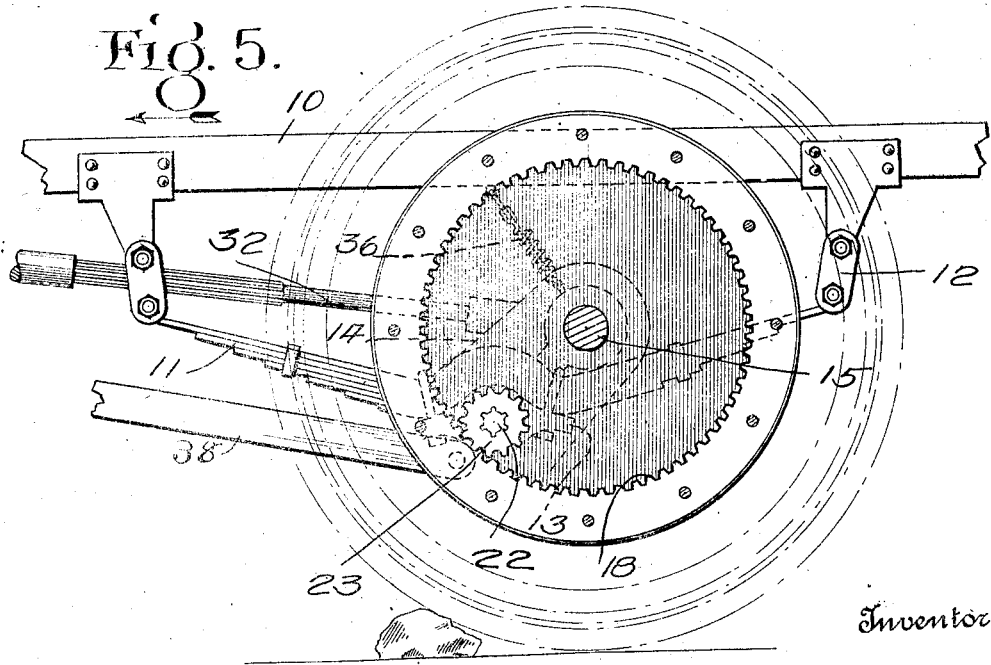
Inventor
PERRY B. NEWKIRK.
Eugene E. Brown
Attorney Patented Feb. 24, 1925.

1,527,696

UNITED STATES PATENT OFFICE.

PERRY B. NEWKIRK, OF SEATTLE, WASHINGTON.

TRANSMISSION MECHANISM FOR MOTOR VEHICLES.

Application filed November 24, 1922. Serial No. 603,108.

*To all whom it may concern:*

Be it known that I, PERRY B. NEWKIRK, a citizen of the United States, residing at Seattle, in the county of Kings and State of Washington, have invented certain new and useful Improvements in Transmission Mechanism for Motor Vehicles, of which the following is a specification.

My invention relates to improvements in drive mechanisms for vehicles, and has for its main purpose to improve the construction of drive mechanisms shown in my patent for motor vehicle transmission mechanism, which was granted to me on May 23, 1922, and bears the Number 1,417,406.

More particularly the main purpose of the present invention is to provide a construction wherein the tail or power shaft will lie more nearly in alinement with the crank shaft of the engine than under the arrangement shown in the prior patent, as well as to provide a power element revolubly mounted on the dead axle from which the traction wheels may be driven.

The mechanical principle involved, and the advantages of the employment of such principles in a motor truck or other vehicle are fully explained in the aforesaid patent, and it is not deemed necessary to again enter into detailed explanation in regard thereto.

In the following description, I shall refer to the accompanying drawings, in which:

Fig. 2 is a partial transverse vertical sectional view on the line 2—2 of Fig. 1, and showing the one form of the device.

Fig. 3 is a view of certain of the parts shown in Fig. 2, the view being a section on the same line of Fig. 1, but showing a somewhat modified arrangement of parts suitable for electric drive.

Fig. 4 is a section on the line 4—4 of Fig. 2 with the parts shown in the position as shown when the vehicle is running free.

Fig. 5 is a view similar to Fig. 4, showing the parts in the position taken when the vehicle strikes an obstruction.

Fig. 6 is a section on the line 6—6 of Fig. 2.

Fig. 7 is a section on the line 7—7 of Fig. 2.

Fig. 8 is a section on the line 8—8 of Fig. 3.

Figure 1:
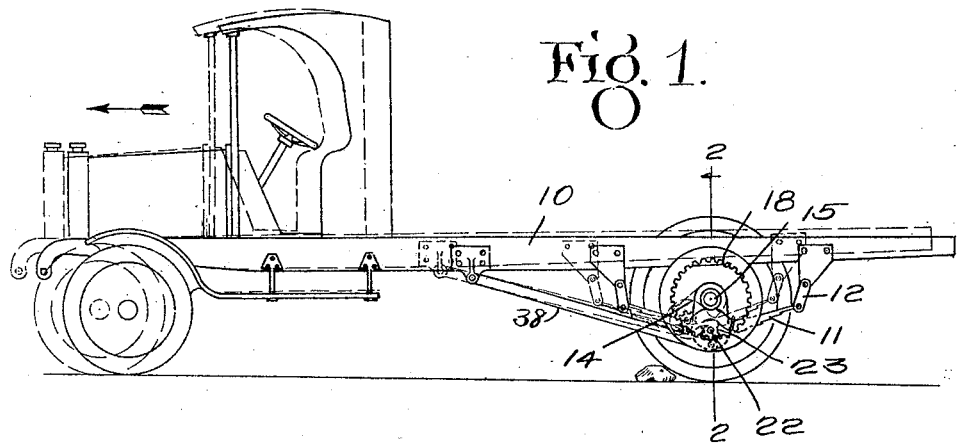
Fig. 1 is a side elevation of a motor truck equipped with my driving mechanism.
Figure 9:
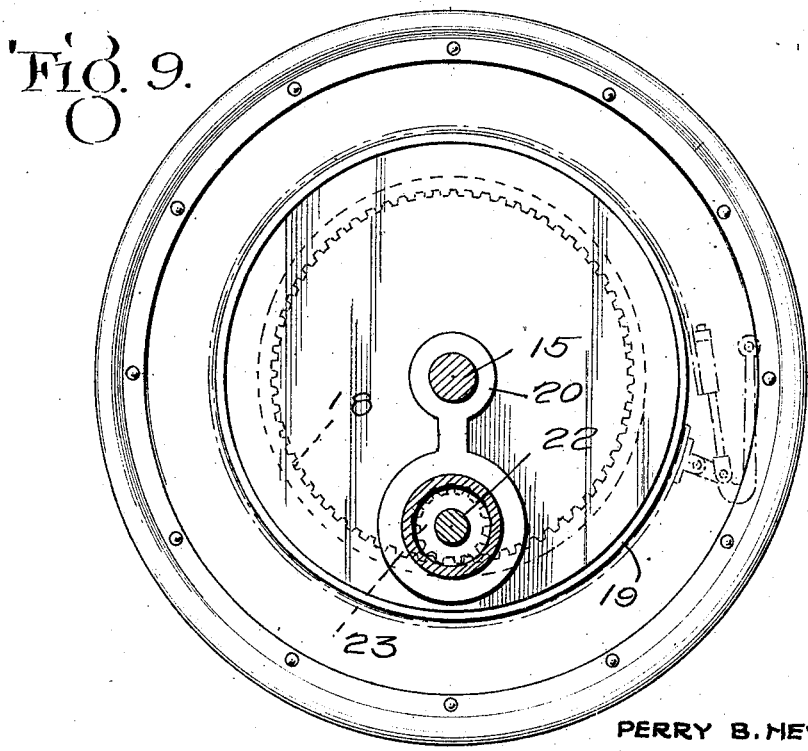
Fig. 9 is a section on the line 9—9 of Fig. 2.

The rear end of the truck body or chassis is shown at 10, and is supported upon the main springs 11 preferably by means of shackles 12. These main springs are rigidly secured to spring seats 13 wherein are mounted the ends of a live axle housing 14 which extends upwardly around the dead axle 15, and is journalled thereon. The dead axle 15 is provided at each end with a suitable bearing 16 whereon is mounted the traction wheel 17, and each traction wheel is provided with an internal gear 18 and brake drum 19. Hangers 20 are swingingly mounted on the dead axle 15, and the lower ends of these hangers receive the ends of the housing 14. Mounted in bearings 21 in the housing 14 are the right and left sections of a live axle or jack shaft 22. Each of these sections carries on its outer end a pinion 23 which meshes with the internal gear 18 of the respective wheel 17. The inner ends of these sections of the jack shaft are journalled in a differential frame 24 carrying stub shafts 25 whereon are revolubly mounted bevel gears 26, which mesh with the gears 27 on the inner ends of the jack shaft section. On this differential frame 24 is also fixed a spur gear 28, and in the upper part of the housing 14, there is mounted on the dead axle 15, a spur gear 29 which meshes with the spur gear 28, and constitutes the driving element for the differential gearing. In the form of the device shown in Fig. 2, it will be seen that the driving gear 29 carries a bevel gear 30 wherewith meshes a gear 31 fixed on the rear end of the drive or power shaft 32 of the vehicle.

In the form of the invention shown in Fig. 3, it will be seen that the driving gear 29 is mounted on the hollow shaft 33 of the rotor 34 of a motor, the stator of the motor being shown at 35. Thus in each instance it will be noted that the driving gear 29 is mounted on the dead axle. Spring hangers 36 are also shown as means for connecting the dead axle 15 yieldably with the frame 10. It will be noted that the drive shaft consists of the usual front and rear sections telescoping together in the ordinary manner.

In the operation of the invention, when the vehicle is standing still, or is pulling a light load over a good road, the hangers 20 will depend vertically, and the driving pinions 23 will be in the position indicated in Fig. 4 directly below the dead axle 15. If, however, a hill is reached, or the truck enters a rough and muddy road, or encounters an obstruction, the traction wheels will immediately be retarded, resulting in a relative movement between the parts, the power transmitted from the engine causing the pinions 23 to gradually move forward and upward over the teeth of the internal gear 18, which constitutes a rack for the pinions, due to its retarded movement, and as a result the entire weight of the truck body and its load are moved forwardly and upwardly with respect to the dead axle to a position such as is indicated in Fig. 5, and in dotted lines in Fig. 1. This forward and upward movement may continue until the springs 11 engage the underside of the dead axle. The weight has thus been moved forwardly with respect to the obstacle and tends to assist by this advantageous position in moving the truck over the obstruction. Furthermore, it will be noted that under these conditions the springs 36 are expanded and the tension of these springs greatly assists the action by throwing added downward moment on the vehicle body. Again, the weight of the truck and its load, together with the power of the springs, which have been transferred to the pinions 23 by reason of the upward swinging of the supports 20 about the dead axle tends to cause the pinions to move downwardly again over the teeth of the internal gear, and this movement is in the proper direction to assist the motive power in rolling the wheels over the obstruction. This action of the weight of the load in assisting to cause the wheels to climb out of the rut, or rise over the obstruction, as the case may be, may be likened to the action of the parts of a tread mill in which the weight is applied forward of the center of the mill. In addition to all this it will be observed that the ratio between the gears 28 and 29 may be, within certain limits, made as great as desired so that a very powerful torque may be exerted on the jack shaft with this arrangement. It is evident therefore, that whenever the rear wheels resist turning movement by reason of some exterior resistance, the turning moment devolving upon the same will be increased by the shifting of the weight of the vehicle to the new position just referred to. Such new position will be largely governed by the amount of resistance, so that a proportionate degree of power will be added.

It will be obvious that action of this mechanism in preventing shocks and other throws, either when applying the brakes, or in suddenly throwing the motor in clutch, will be as fully efficacious as the action in my previously described patent, and that in addition by having the main driving element journalled on the dead axle, the rear end of the drive shaft may be elevated above that shown in said patent, and thereby lie more nearly in alinement with the crank shaft of the engine. Furthermore, it will be obvious that this construction lends itself readily to a truck motor drive on the dead axle while retaining all of the advantages heretofore noted.

Inasmuch as the housing 14 which encloses the differential gearing and the driving gear 29 may swing in an arcuate path about the dead axle while the drive shaft 32 and its driving pinion 31 are relatively fixed in relation to the vehicle body, I provide an auxiliary housing 14 to enclose the outer end of the drive shaft and its pinion, the main housing and the auxiliary housing thus being movable with respect to each other. The links or radius rods 38 connect the housing 14 to the vehicle body and restrain bodily movement of the housing with respect to the vehicle body.

I have described in detail the particular construction illustrated in the accompanying drawings for the purpose of clearly disclosing the embodiment of my invention, but it will be evident to engineers that various changes and modifications may be made without departing from the essential principles thereof.

I claim:

1. A transmission mechanism for motor vehicles, comprising a dead axle having an end bearing, a traction wheel thereon having a concentric gear, a live axle or jack shaft provided with a pinion in mesh with said gear, a housing having bearings in which said live axle is mounted, a swinging mounting journalled at its opposite ends upon said dead axle and said housing respectively, means secured to the vehicle body and rigidly secured to said housing whereby the live axle is maintained in parallel relation with the vehicle body, but may move in an arcuate path with respect to said dead axle, a driving gear journalled on the dead axle, and gearing within the housing connecting the live axle or jack shaft with the driving gear.

2. A driving axle construction for motor vehicles, comprising a dead axle having end bearings, traction wheels mounted thereon each having a concentric gear, a jack shaft carrying pinions in mesh with said gears, a jack shaft housing having bearings in which said jack shaft is mounted, a swinging mounting between said axle and said housing rotatably carrying the housing whereby to permit the latter to move in an arcuate path upon opposite sides of the axle, a vehicle body mounted upon and secured to said housing whereby the latter is maintained in parallel relation to said body, a driving gear journalled on the dead axle, and gearing driven from the driving gear and driving the jack shaft.

3. A driving axle construction for motor vehicles comprising a dead axle having end bearings, traction wheels mounted thereon each having a concentric gear, a jack shaft carrying pinions in mesh with said gears, a housing having bearings in which said jack shaft is mounted, a swinging mounting between said axle and said housing rotatably carrying the housing whereby to permit the latter to move in an arcuate path upon opposite sides of the axle, vehicle springs rigidly secured to said housing, a vehicle body mounted upon said springs, a driving gear journalled on the dead axle, and gearing driven from the driving gear and driving the jack shaft.

4. A driving axle construction for motor vehicles, comprising a dead axle having end bearings, traction wheels mounted thereon each having a concentric gear, a two part jack shaft carrying pinions in mesh with said gear, a differential gearing connecting the two parts of the jack shaft, a housing having bearings in which said jack shaft is mounted, a swinging mounting between said axle and said housing rotatably carrying the housing whereby to permit the latter to move in an arcuate path upon opposite sides of the axle, a vehicle body mounted upon and secured to the housing to maintain the housing in parallel relation to the body, a driving gear on the dead axle, and a driving gear fixed to the differential gearing and meshing with said driving gear.

5. A driving axle construction for motor vehicles, comprising a dead axle having end bearings, traction wheels mounted thereon each having a concentric gear, a two part jack shaft carrying pinions in mesh with said gear, a differential gearing connecting the two parts of the jack shaft, a housing having bearings in which said jack shaft is mounted, a swinging mounting between said axle and said housing rotatably carrying the housing whereby to permit the latter to move in an arcuate path upon opposite sides of the axle, a vehicle body mounted upon and secured to the housing to maintain the housing in parallel relation to the body, a driving gear on the dead axle, a driving gear fixed to the differential gearing and meshing with said driving gear, and tension springs connecting the vehicle body and the dead axle.

6. A driving axle construction for motor vehicles, comprising a dead axle having end bearings, traction wheels mounted thereon each having a concentric gear, a two part jack shaft carrying pinions in mesh with said gear, a differential gearing connecting the two parts of the jack shaft, a housing having bearings in which said jack shaft is mounted, a swinging mounting between said axle and said housing rotatably carrying the housing whereby to permit the latter to move in an arcuate path upon opposite sides of the axle, a vehicle body mounted upon and secured to the housing means to maintain the jack shaft in parallel relation to the body, a driving gear on the dead axle, and a driven gear fixed to the differential gearing and meshing with said driving gear, said means including links connecting the housing with the vehicle body whereby to restrain bodily movement of the housing with respect to said vehicle body.

7. In a transmission mechanism as set forth in claim 1, a drive shaft having its outer end operatively connected to said driving gear, and an auxiliary housing rotatably mounted upon said axle and enclosing said connected end of the drive shaft.

In testimony whereof I affix my signature.

PERRY B. NEWKIRK.